(12) United States Patent
Carbo et al.

(10) Patent No.: US 6,406,779 B1
(45) Date of Patent: Jun. 18, 2002

(54) GYPSUM/FIBER BOARD WITH IMPROVED SURFACE CHARACTERISTICS

(75) Inventors: Adelaida L. Carbo, Barrington; Peter M. Attard, Elk Grove, both of IL (US)

(73) Assignee: United State Gypsum Company, Chicago, IL (US)

( * ) Notice: Subject to any disclaimer, the term of this patent is extended or adjusted under 35 U.S.C. 154(b) by 0 days.

(21) Appl. No.: 09/220,555

(22) Filed: Dec. 23, 1998

Related U.S. Application Data
(60) Provisional application No. 60/073,503, filed on Feb. 3, 1998.

(51) Int. Cl.$^7$ .......................... B32B 15/00; B32B 13/00
(52) U.S. Cl. ..................... 428/219; 428/311.11; 156/71
(58) Field of Search ................................ 428/195, 219, 428/311.11; 156/71

(56) References Cited

U.S. PATENT DOCUMENTS

| | | | |
|---|---|---|---|
| 2,894,857 A | 7/1959 | Uraneck et al. ............. | 117/118 |
| 2,901,377 A | 8/1959 | Bode .......................... | 117/70 |
| 3,085,907 A | 4/1963 | Zdanowski et al. ......... | 117/126 |
| 3,210,212 A | 10/1965 | Carson et al. ........... | 427/385 C |
| 3,350,257 A | 10/1967 | Hourigan et al. ............. | 161/43 |
| 3,630,817 A | 12/1971 | Winkowski .................. | 117/38 |
| 4,057,662 A | 11/1977 | Johnson et al. ............. | 427/209 |
| 4,091,124 A | 5/1978 | Reighter ...................... | 427/58 |
| 4,225,651 A | 9/1980 | Hutton et al. ................ | 428/443 |
| 4,430,463 A | 2/1984 | Mullenax ....................... | 524/5 |
| 4,496,636 A | 1/1985 | Exner .......................... | 428/703 |
| 4,514,471 A | 4/1985 | Sugimoto et al. ............ | 428/703 |
| 4,536,534 A | 8/1985 | Singer et al. ................ | 524/262 |
| 4,579,610 A | 4/1986 | Kole et al. ..................... | 156/44 |
| 4,588,625 A | 5/1986 | Puskar ......................... | 428/36 |
| 4,670,079 A | 6/1987 | Thompson ............... | 156/307.5 |
| 4,746,552 A | 5/1988 | Tokumoto et al. ........ | 427/393.6 |
| 4,948,647 A | 8/1990 | Burkhard ..................... | 428/70 |
| 5,035,944 A | 7/1991 | Frazza et al. ............ | 428/312.4 |
| 5,135,805 A | 8/1992 | Sellers et al. ................ | 428/302 |
| 5,236,994 A | 8/1993 | Markusch et al. .......... | 524/589 |
| 5,270,373 A | 12/1993 | Wiercinski et al. ......... | 524/423 |
| 5,320,677 A | 6/1994 | Baig .......................... | 106/780 |
| 5,342,566 A | 8/1994 | Schafer et al. .............. | 264/102 |
| 5,360,847 A | 11/1994 | Dewacker et al ............. | 524/56 |
| 5,372,676 A | 12/1994 | Lowe .......................... | 156/654 |
| 5,397,631 A | 3/1995 | Green et al. ................ | 428/219 |
| 5,494,741 A | 2/1996 | Fekete et al. ................ | 428/331 |
| 5,552,187 A | 9/1996 | Green et al. ............. | 427/389.8 |
| 5,637,362 A | 6/1997 | Chase et al. .................. | 428/15 |

OTHER PUBLICATIONS

Natus—"Gypsum fiberboard production in Nova Scotia, Canada" Presented at the Second International Inorganic Bonded Wood and Fiber Composite Materials Conference held Oct. 15–17, 1990 (pp. 85–87).

*Primary Examiner*—Cathy Lam
(74) *Attorney, Agent, or Firm*—Donald E. Egan; John M. Lorenzen; David F. Janci

(57) ABSTRACT

A paperless gypsum/fiber board with improved surface characteristics has at least one surface comprising a combination of fully hydrated gypsum and reinforcing fiber and has been coated with a primer comprising an aqueous emulsion of a film-forming polymeric material.

16 Claims, No Drawings

GYPSUM/FIBER BOARD WITH IMPROVED SURFACE CHARACTERISTICS

This application claims the benefit of copending provisional application Serial No. 60/073,503 filed Feb. 3, 1998.

BACKGROUND OF THE INVENTION

The present invention relates generally to a paperless gypsum/fiber board with improved surface characteristics, to a process for making such a gypsum/fiber board, and to a primer for use on such gypsum/fiber board to provide improved surface characteristics. More particularly, the present invention relates to a primer to improve the surface characteristics of fiber-reinforced gypsum panels.

Conventional gypsum wallboard or panel is typically manufactured from a plaster slurry wherein a wet slurry of calcium sulfate hemihydrate, generally referred to as calcined gypsum, is placed between two layers of paper and the slurry is allowed a certain amount of time to set. The set gypsum is a hard and rigid product obtained when the calcined gypsum reacts with water to form calcium sulfate dihydrate. Calcined gypsum is either calcium sulfate hemihydrate ($CaSO_4 \cdot \frac{1}{2} H_2O$) or calcium sulfate anhydrite ($CaSO_4$). When calcium sulfate dihydrate is heated sufficiently, in a process called calcining, the water of hydration is driven off and there can be formed either calcium sulfate hemihydrate, calcium sulfate anhydrite, or both, depending on the temperature and duration of exposure. When water is added to the calcined gypsum to cause the gypsum to set, in essence, the calcined gypsum reacts with water, and the calcined gypsum is rehydrated.

In typical gypsum wallboard, the two layers of paper contain the slurry and provide the strength required in installation and use. The wallboard is cut into discrete lengths to accommodate subsequent handling and then dried in heated dryers until the board is completely dry. The bending strength of the wallboard depends largely on the tensile strength of the paper. The gypsum serves as the core and accounts for fire resistance and moisture absorbing and moisture releasing activities. The paper determines the nature of the joint filler system and the surface treatment that may be used on the board.

Although paper-covered wallboard has many uses and has been a popular building material for many years, the prior art has recognized that for certain applications it would be advantageous to provide gypsum panel that did not rely on paper surface sheets for strength and other properties. Several prior art fiber-reinforced gypsum panels are as follows:

U.S. Pat. No. 5,320,677 to Baig, which is incorporated by reference herein in its entirety, describes a composite product and a process for producing the product in which a dilute slurry of gypsum particles and cellulosic fibers are heated under pressure to convert the gypsum to calcium sulfate alpha hemihydrate. The cellulosic fibers have pores or voids on the surface and the alpha hemihydrate crystals form within, on and around the voids and pores of the cellulosic fibers. The heated slurry is then dewatered to form a mat, preferably using equipment similar to paper making equipment, and before the slurry cools enough to rehydrate the hemihydrate to gypsum, the mat is pressed into a board of the desired configuration. The pressed mat is cooled and the hemihydrate rehydrates to gypsum to form a dimensionally stable, strong and useful building board. The board is thereafter trimmed and dried. The process described in Patent No. 5,320,677 is distinguishable from the earlier processes in that the calcination of the gypsum takes place in the presence of the cellulosic fibers, while the gypsum is in the form of a dilute slurry, so that the slurry wets out the cellulosic fibers, carrying dissolved gypsum into the voids of the fibers, and the calcining forms acicular calcium sulfate alpha-hemihydrate crystals in situ in and about the voids.

U.S. Pat. No. 5,135,805 to Sellers et al, describes a water resistant gypsum product that may be a "faceless" product, i.e. it may not include a facing sheet of paper, fiberglass mat or similar material. The gypsum products described by U.S. Pat. No. 5,135,805 typically contain reinforcing fibers, for example, cellulosic fibers, such as wood or paper fibers, glass fibers or other mineral fibers and polypropylene or other synthetic resinous fibers. The reinforcing fibers can be about to about 20 wt. % of the dry composition from which the set gypsum product is made. The density of such a product is typically within the range of about 50 to about 80 pounds per cubic foot.

U.S. Pat. No. 5,342,566 to Schafer et al, which is incorporated by reference herein in its entirety, refers to a method of producing fiber gypsum board comprising the steps of mixing in a preliminary mixing step predetermined amounts of fibers and water respectively, to form a mixture of wetted, loose fibers; mixing in a mixing step the wetted fibers with a predetermined amount of dry calcined gypsum; premixing an accelerator with one of the components of dry calcined gypsum, fiber and water; promptly laying the mixed composition into a mat; immediately degassing the mat in a first compression step, adding a predetermined amount of water onto the resultant mat; and immediately compressing the mat to form a board composed of bonded fibers and gypsum. This process produces a homogeneous board which is preferably a gypsum board reinforced by fiber, such as paper fiber, wherein several layers of board forming materials are placed on each other before the board is fully formed, pressed, and dried and wherein each of the layers is identical in composition.

U.S. Pat. No. 5,637,362 to Chase et al, which is incorporated by reference herein in its entirety, describes a thin, sealant-coated, fiber-reinforced gypsum panel. This patent describes a wax-free, water-resistant "sealant" which is applied to the board after the board has been dried. The sealant, which preferably is a siliconate mixture, reduces the absorption of water, glue or adhesives into the panel.

Carbo et al Provisional Application Serial No. 60/073, 503, which is incorporated by reference herein in its entirety, describes a paperless gypsum/fiber board with improved surface characteristics, a process for making such a gypsum/fiber board, and a primer for use on such gypsum/fiber board to provide improved surface characteristics.

The term "paperless" gypsum/fiber board, as used herein, is intended to distinguish the fiber-reinforced gypsum panels to which the present invention applies from conventional prior art gypsum panels, which are referred to as "wall board" or "dry wall" which have at least one surface comprised of paper, including "wall board" or "dry wall" having some additional form of fiber-reinforcement in the core.

The prior art paperless fiber-reinforced gypsum panels have surface characteristics which differ from the conventional paper-covered wallboard and the difference in the surface characteristics creates an array of problems for the tradesmen who use or install such panels. For example, some of the prior art fiber reinforced gypsum panels tend to absorb water quickly. As a consequence, joint compound applied to such panels does not have sufficient "working time", i.e. the joint compound dries out before it can be finished properly. Similar problems are encountered in the application of adhesives and paints to the fiber reinforced gypsum panels. Another problem occurs when paints and coatings applied to the fiber reinforced gypsum panels for decorative purposes do not consistently flow over and wet the surface of the panels. This causes major problems in decorating the panels.

However, some coatings or sealants, such as the siliconate sealant described in U.S. Pat. No. 5,632,362 to Chase et al, produce a seal that is too complete, that is they seal the surface so effectively that the "suction" of the surface of the board is reduced which results in deteriorated joint compound performance, and increased drying time for paint.

It is the objective of the present invention to provide a primer system that overcomes these problems in paperless fiber-reinforced gypsum panels.

It is a further objective of the present invention to provide a primer system for paperless fiber-reinforced gypsum panels having improved surface characteristic.

It is yet a further objective of the present invention to provide a primer system for paperless fiber-reinforced gypsum panels having improved paint and joint compound performance.

SUMMARY OF THE INVENTION

The present invention relates generally to a paperless gypsum/fiber board with improved surface characteristics, to a process for making such a gypsum/fiber board, and to a primer for use on such gypsum/fiber board to provide improved surface characteristics. More particularly, the present invention relates to a primer to improve the surface characteristics of paperless fiber-reinforced gypsum board. Still more particularly, the present invention relates to a primer to improve the paint and joint compound performance characteristics of paperless fiber-reinforced gypsum board. The primer is designed to be applied to a fiber-reinforced gypsum board of the type described in the foregoing prior art or any of the prior art paperless fiber-reinforced gypsum board.

The primer of the present invention is a water-based system that must be heated after application to effect a cure. The primer is based on a latex, that is an aqueous emulsion of a film forming polymeric material having a glass transition temperature in the range of from 10 to 40° C. and preferably in the range of 12 to 20° C. The polymeric material is selected from acrylic polymers or copolymers and mixtures of acrylic polymers or copolymers with other thermoplastic polymers. The primer may be pigmented to give the primer a color and it may contain a filler such as limestone or silica, depending upon the end-use of the panels.

The primer is preferably applied to the surface of the board during the manufacturing process, before the board is dried, in order to cure the primer on the surface of the board as the board is dried.

The primer provides the following improvements to the surface of the board:

1. Provides a uniform, smooth surface for the board;
2. Provides good adhesion for paint, mortar and adhesives which are subsequently applied to the board;
3. Provides water resistance which protects the adhesion of paint, mortar and adhesives to the board even though the board comes in contact with water;
4. Provides uniform "suction" and uniform "absorption" of water from paint, adhesives, and joint compounds, so that the paint, adhesives, and joint compounds have adequate "working time"; and
5. Provides improved scuff resistance to the panels both before and after decoration.

DETAILED DESCRIPTION OF THE PRESENT INVENTION

The present invention relates generally to a paperless gypsum/fiber board with improved surface characteristics, to a process for making such a gypsum/fiber board, and to a primer for use on such gypsum/fiber board to provide improved surface characteristics. The primer of the present invention may be used with any of the prior art fiber-reinforced gypsum panels or with any of the newly formulated fiber reinforced gypsum panels as described in Provisional Application 60/073,503.

GYPSUM FIBER BOARD

The present invention contemplates the formation of fiber-reinforced gypsum board having a homogeneous structure throughout, as well as composite boards having two or more distinct layers. It is contemplated that the primer of the present invention will be used on a board having at least one surface comprised of fully hydrated gypsum and reinforcing fiber.

THE PRIMER

The primer of the present invention is a water-based system that must be heated after application to effect a cure and to achieve the improvements in the surface characteristics of paperless gypsum/fiber board described above. The primer is based on a latex, that is an aqueous emulsion, of a film forming polymeric material having a glass transition temperature in the range of from 10 to 40° C. and preferably in the range of 12 to 20° C. Polymeric materials having a $T_g$ in the 12 to 20° C. range are preferred because less heat is required to form a film on the board surface.

The polymeric material is selected from film forming acrylic polymers or copolymers and mixtures of acrylic polymers or copolymers with other thermoplastic polymers. As used herein the term "polymers" is intended to include both homopolymers and copolymers, and the term "copolymers" is intended to include polymers made from two or more different monomers. The acrylics are preferred because they don't swell in the presence of alkalis. The polyvinyl acetate/acrylate copolymers may be used to soften the acrylic polymers. The acrylics may be copolymerized with vinyls and/or styrene to provide polymers with appropriate glass transition temperatures.

The present invention contemplates the use of latexes that include acrylics, vinyl acrylics, polyvinylacetate/acrylics, styrene/acrylics, ethylene/vinylchlorides and ethylene/ vinylchloride/vinylacetates, provided they are film formers and have glass transition temperatures within the 12 to 40° C. range.

Among the commercially available acrylic emulsions that may be used are POLYCO 3103, an aqueous emulsion containing about 50% by weight of a vinyl acetate/acrylic copolymer having a glass transition temperature of 13° C., which is sold by Rohm and Haas Company. Other commercially available emulsions that may be used are listed in Table 1, below.

TABLE 1

| TRADE NAME | POLYMER TYPE | $T_g$ DEGREES C. |
|---|---|---|
| Acronal 296 | Styrene-acrylic copolymer | 22 |
| Airflex 4530 | Ethylene-vinyl chloride copolymer | 30 |
| CS 3800 | Styrene-acrylic copolymer | 40 |
| EI 8764 | All acrylic copolymer | 10 |
| Flexbond 325 | Vinyl-acrylic copolymer | 13 |
| Polyco 3103 | Vinyl-acrylic copolymer | 13 |
| Rhoplex 3001 | All-acrylic copolymer | 32 |
| UL-710A | Styrene-acrylic copolymer | 10 |
| Wallpol 40-100 | Vinyl acetate homopolymer | 30 |
| Wallpol 40-136 | Vinyl-acrylic copolymer | 20 |

High $T_g$ polymers may be blended with low $T_g$ polymers in order to improve film formation using the high Tg polymers. Plasticizers and softening agents such as esters and alcohols may be added to the polymeric material to aid coalescence of the polymeric material and thus lower the effective glass transition temperature of the polymer.

The primer may be pigmented to give the primer a color and it may contain a filler such as limestone or silica. Primers containing pigments and/or fillers tend to minimize board-to-board sticking. A variety of conventional additives, such as defoamers or biocides, may also be included in the primers.

It has been found necessary to apply a volume of primer sufficient to completely wet the surface of the board in order to obtain a uniform coating of the primer on the board. It is preferred to use from about at least 14 grams and up to 20 grams of a clear aqueous primer (e.g. composition E of Table 2) per square foot of board to obtain the best improvement in surface characteristics. The most preferred application range for clear aqueous primer is about 18 grams of primer per square foot of board. The preferred application range for a pigmented primer (e.g. composition B of Table 2) is from about at least 7.5 grams and up to about 15 grams per square foot of board.

In order to achieve the best surface characteristics on board designed for interior use, i.e. board designed to compete with conventional wallboard, about 0.50 to about 1.00 grams of polymer solids per square foot of board should be used. Using less than 0.50 grams of polymer solids per square foot of board sometimes results in an incomplete film on the surface, which may reduce the "open time" slightly when coated with a semi-gloss latex, as shown in Table 7. However using less than 0.50 grams of polymer solids per square foot of board provides some improved surface characteristics. Using more than 1.0 grams of polymer solids per square foot tends to produce a seal that is too complete, which reduces the "suction" of the surface of the board, deteriorates joint compound performance, and increases drying time of paint. The surface characteristics of underlayment boards may be improved by applying pigmented primers at about 0.35 to about 0.70 grams of polymer solids per square foot of board.

The primer of the present invention may be applied to the fiber-reinforced gypsum board using a variety of techniques including spraying, roll coating or curtain coating. The Example 1, which follows, illustrates a flood coating technique to apply the primer.

The primer of the present invention may be applied to the fiber-reinforced gypsum board at any desired point in the manufacture of the board. Because the primer must be heated after application it is preferred to apply the primer to the board prior to the final drying of the board. However, the primer may be applied to the board after the board is completely dried, provided the board is then heated again under conditions sufficient to cure the primer.

The primer of the present invention may be dried on the fiber-reinforced gypsum board under a variety of conditions. Generally, the board must be heated under conditions that remove all of the water from the primer coating and heat the primer sufficiently to coalesce the polymeric particles and seal the surface of the board. Generally, applying air heated to 100 to 500° F. to the coated board for 1 to 10 minutes in a dryer is adequate to cure the primer.

Table 2, below shows the useful ranges of materials, by weight, which may be used in the preferred type of primers, along with formulations for 4 specific, useful primers.

TABLE 2

| Material | Usable Range % by weight | A clear | B | C | D Clear | E clear | F clear |
|---|---|---|---|---|---|---|---|
| Latex (solids) (i.e. polymeric material) | 2.8–40% | 15 | 7 | 9 | 5.0 | 2.8 | 2.3 |
| Pigment | 0–10% | 0 | 5 | 3 | 0 | 0 | 0 |
| Limestone | 0–60 | 0 | 50 | 20 | 0 | 0 | 0 |
| Silica | 0–25 | 0 | 0 | 20 | 0 | 0 | 0 |
| Additives | 0–5 | 2 | 2 | 2 | 0.4 | 0.2 | 0.2 |
| Water | 38–97.5 | 85 | 38 | 46 | 94.6 | 97.0 | 97.5 |

The latex used in composition A was POLYCO 3103, an aqueous emulsion containing about 50% by weight of a vinyl acetate/acrylic copolymer having a glass transition temperature of 13° C., and is sold by Rohm and Haas Company. Composition A is a useful primer for interior wallboard.

The latex used in composition B POLYCO 3103, an aqueous emulsion containing about 50% by weight of a vinyl acetate/acrylic copolymer having a glass transition temperature of 13° C., and is sold by Rohm and Haas Company. Composition B has been used as a primer for interior panels and as a primer for floor underlayment boards. Preferably, the primer for underlayment boards is pigmented and is applied to both surfaces of the underlayment board.

The latex used in composition C was EI 8764, an aqueous emulsion containing about 50% by weight of an all acrylic copolymer having a glass transition temperature of 10° C., and is sold by Rohm and Haas Company. Composition C is a useful primer for ceramic tile backing because it provides better water resistance.

The latex used in compositions D, E and F was POLYCO 3103, an aqueous emulsion containing about 50% by weight of a vinyl acetate/acrylic copolymer having a glass transition temperature of 13° C., and is sold by Rohm and Haas Company.

The following example will serve to illustrate the manufacture of a gypsum/fiber board product that has improved surface characteristics by the use of the primer of the present invention. However, it should be understood that this example is set forth for illustrative purposes and that many other gypsum fiber products are within the scope of the present invention.

EXAMPLE 1

Composite paperless fiber reinforced gypsum panels are produced in the following manner. Calcined gypsum (calcium sulfate hemihydrate) is blended with recycled paper fibers, expanded perlite, starch, water and potassium sulfate to form a three-layer board. Three formulations of fiber and gypsum, shown below in Table 2, are prepared for use as the bottom surface layer ("SLB"), as the top surface layer ("SLT"), and as the center layer ("CL"). These formulations are used to prepare a 3-layer gypsum/fiber board ⅝ inches thick, using the continuous process and apparatus described in Provisional Application 60/073,503 under the heading "MULTI-LAYER GYPSUM FIBER BOARD" at the rates shown in Table 3.

TABLE 3

| COMPONENT | SLB | SLT | CL | Dimension |
|---|---|---|---|---|
| Fiber | 2005 | 2005 | 250 | lb/hr |
| Stucco | 7853 | 7853 | 9245 | lb/hr |
| Raw Gypsum | 39.3 | 39.3 | 46.2 | lb/hr |
| K₂SO₄ | 62.8 | 62.8 | 74.0 | lb/hr |
| Perlite | 0 | 0 | 6401 | lb/hr |
| Starch | 0 | 0 | 100 | lb/hr |
| Water | 4139 | 4139 | 5744 | lb/hr |
| Total Formulation | 11138 | 11138 | 17503 | lb/hr |
| Total Board | 40539 | | | lb/hr |

The fiber used is a scrap paper fiber. The "stucco" is 96.952% calcium sulfate hemihydrate, the balance being inert impurities. The stucco requires 15% by weight of water to form the complete hydrate. The resulting three-layer board is ⅝ inches thick and has a density of 55 pounds per cubic foot of which the center layer is 44% and the surface layers 28% each. Owing to the relatively low paper content of the center layer, the resulting board passes the ASTM E136 test for non-combustibility. Yet the board has high overall strength because of the high paper fiber content of the surface layers.

The dried board is passed to a coating station. The primer concentrate composition shown in Table 4 is first diluted with approximately 7 parts of water for each part of concentrate. This provides a coating composition having about 2.8% by weight of solids. The primer is then flood coated on the top surface of the board at a rate of about 16 grams (wet) per square foot. This provided about 0.448 grams of polymer solids per square foot of board. The coated board is passed into a dryer having air at 150° F. for about 2 minutes and 45 seconds.

TABLE 4

| Component | Pounds | Percentage |
|---|---|---|
| POLYCO 3103 | 318.50 | 36.97 |
| TAMOL 731 | 5.50 | 0.64 |
| PX 047 | 9.50 | 0.48 |
| AMP-95 | 1.50 | 1.10 |
| NOPCO NXZ | 0.25 | 0.03 |
| KATHON LX 1.5% | 2.25 | 0.26 |
| Water | 524.00 | 60.82 |
| TOTAL WEIGHT (POUNDS) | 861.50 | 100.00 |
| TOTAL VOLUME (GALLONS) | 100.59 | |

In the primer, the POLYCO 3103 is an aqueous emulsion containing about 50% by weight of a vinyl acetate/acrylic copolymer having a glass transition temperature of 13° C. and is sold by Rohm and Haas Company. The TAMOL 731 is a dispersant and is sold by Rohm and Haas Company. The PX 047 (Also known as "PROCOTE 4200") is a soy protein and is sold by Protein Technology. The AMP-95 is an amine neutralizer and is sold by Angus. The NOPCO NXZ is a defoamer and is sold by Henkels. The KATHON LX is a biocide and is sold by Rohm and Haas Company.

The coated board had a uniform surface with uniform absorption properties, good paint compatibility, good hiding and drying properties and improved resistance to surface abrasion.

EXAMPLE 2

A composite paperless gypsum/fiber board ("Test Board") was prepared and coated in accordance with Example 1 using the pigmented primer composition B of Table 2 at the polymer solids shown below in Table 5. The test boards were subjected to various tests and the test results are shown below in Table 5. The performance of all of the boards tested was rated on a scale of 1 to 20, other than "Abrasion" test that is reported in percent weight lost. The gypsum board, which was the control for the tests, was assigned an arbitrary value of 10 and the test boards were given scores between 1 and 20, depending upon their performance relative to gypsum board, with 1 being the worst, and 20 being the best.

TABLE 5

| Tests | Gypsum Board | Test Board no coating | Test Board #12 Pigmented Primer | Test Board #16 Pigmented Primer | Test Board #17 Pigmented Primer |
|---|---|---|---|---|---|
| Polymer Solids/ft² | None | None | 0.701–.747 g/ft² | 0.42–.455 g/ft² | 0.42–.455 g/ft² |
| Coating Weight | None | None | 15 g/ft² | 12 g/ft² | 12 g/ft² |
| Open Time -APRM | 10 | 9 | 8 | 7 | 9 |
| Application -APRM | 10 | 6 | 8 | 8 | 8 |
| Open Time Flat Latex | 10 | 6 | Not Run | 7 | 7 |
| Dry Hide - Flat Latex | 10 | 10 | Not Run | 10 | 10 |
| Open Time Semi-gloss Latex | 10 | 8 | Not Run | 9 | Not Run |

TABLE 5-continued

| Tests | Gypsum Board | Test Board no coating | Test Board #12 Pigmented Primer | Test Board #16 Pigmented Primer | Test Board #17 Pigmented Primer |
|---|---|---|---|---|---|
| Dry Hide - Semi-gloss Latex | 10 | 11 | Not Run | 15 | Not Run |
| Abrasion (Weight loss) | .05 | .17 | .03 | .01 | .04 |

The gypsum board, which was the control for the tests, was conventional gypsum board sold under the Trademark "Sheetrock" by U.S. Gypsum Co.

The test labeled "Open Time—APRM" was run by applying 9 grams of "All Purpose Ready Mix" joint compound to the test board and counting the number of strokes that could be made with a 5 inch trowel before the joint compound became stiff. The "Open Time" for the Gypsum Board was assigned an arbitrary value of 10 and the Test Boards were assigned a number on a scale of 1 to 20 based on the performance of the Test Board compared to the Gypsum Board. This test evaluates the relative "working time" of joint compound on the Test Panels.

The test labeled "Application—APRM" was run by applying 200 grams of "All Purpose Ready Mix" joint compound to the test board with a large trowel and evaluating the workability of the joint compound before it became stiff. The "Application" for the Gypsum Board was assigned an arbitrary value of 10 and the Test Boards were assigned a number on a scale of 1 to 20 based on the performance of the Test Board compared to the Gypsum Board. This test also evaluates the relative "working time" of joint compound on the Test Panels.

The tests labeled "Open Time—Flat Latex" and "Open Time—Semi-gloss Latex" were run by applying the specified type of paint, using a roller, to the Test Board on which a strip of joint compound had been applied and measuring the time for the paint to dry. The "Open Time" for the Gypsum Board was assigned an arbitrary value of 10 and the Test Boards were assigned a number on a scale of 1 to 20 based on the performance of the Test Board compared to the Gypsum Board. This test evaluates the relative "working time" of the specified paint on the Test Panels. The test data shown in Table 5 indicates that the primer improves the working time for specified paint applied to the Test Boards.

The tests labeled "Dry Hide—Flat Latex" and "Dry Hide—Semi-gloss Latex" were run by applying the specified type of paint, using a roller, to the Test Board on which a strip of joint compound had been applied. After allowing the paint to dry, the board is visually inspected to evaluate how well the paint covered the surface of the joint compound as compared to how well the paint covered surface of the primer treated board where no joint compound had been applied. The "Dry Hide" for the Gypsum Board was assigned an arbitrary value of 10 and the Test Boards were assigned a number on a scale of 1 to 20 based on the performance of the Test Board compared to the Gypsum Board. This test evaluates the relative absorption or "hold out" of the specified paint on the Test Panels.

The test labeled "Abrasion (Weight loss)" was run by subjecting the test board to 10 cycles (20 strokes) in a 3 M Granular Tester with a steel brush and measuring the average weigh lost of three tests. Table 5 reports the actual average weight lost, in grams, for both the Gypsum Board and the Test Boards. This test evaluates the relative "scuff resistance" of the Test Panels. The lower the weight loss, the better the scuff resistance.

The test data shown in Table 5 indicates that in this test the pigmented primer did not markedly change the working time for joint compound applied to the Test Boards, but that the primer did improve the joint compound application properties. The test data shown in Table 5 indicates that the primer generally improves the paintability of the Test Boards. The test data shown in Table 5 indicates that the primer improves the scuff resistance of the Test Boards to the point that the scuff resistance of the coated test boards is superior to conventional gypsum board.

EXAMPLE 3

A composite paperless gypsum/fiber board ("Test Board") was prepared in accordance with Example 1. The clear primers were applied to test boards by spraying the boards in the laboratory. The clear primer compositions used on the test boards in Table 6 were the composition shown above in Table 2 as Composition D (clear) made using either POLYCO 3001 or POLYCO 3103, as indicated, as the polymeric material. The test boards were subjected to various tests and the results test results are shown below in Table 6.

TABLE 6

| Tests | Gypsum Board | Test Board uncoated | Test Board AC3001 Clear Primer | Test Board AC3001 Clear Primer | Test Board AC3103 Clear Primer | Test Board AC3103 Clear Primer |
|---|---|---|---|---|---|---|
| Polymer Solids/ft$^2$ | None | None | 0.375–.425 g/ft$^2$ | 0.60–.65 g/ft$^2$ | 0.375–.425 g/ft$^2$ | 0.60–.65 g/ft$^2$ |
| Coating Wt | None | None | 7.5 g/ft$^2$ | 12 g/ft$^2$ | 7.5 g/ft$^2$ | 12 g/ft$^2$ |

TABLE 6-continued

| Tests | Gypsum Board | Test Board uncoated | Test Board AC3001 Clear Primer | Test Board AC3001 Clear Primer | Test Board AC3103 Clear Primer | Test Board AC3103 Clear Primer |
|---|---|---|---|---|---|---|
| Open Time -APRM | 10 | 10 | 11 | 12 | 15 | 17 |
| Application-APRM | 10 | 6 | 7 | 8 | 9 | 12 |
| Open Time Semi-gloss Latex | 10 | 6 | 8 | 9 | 9 | 9 |
| Dry Hide - Semi-gloss Latex | 10 | 10 | 10 | 8 | 10 | 8 |
| Abrasion (Weight loss) | .05 | .17 | .02 | .02 | .01 | .01 |

The test data shown in Table 6 indicates that in this test the clear primer improved the working time for joint compound applied to the Test Boards, and that the primer improved the joint compound application properties. The test data shown in Table 6 indicates that the clear primer generally improves the paintability of the Test Boards. The test data shown in Table 6 indicates that the clear primer improves the scuff resistance of the Test Boards to the point that the scuff resistance of the coated test boards is superior to conventional gypsum board.

EXAMPLE 4

A composite paperless gypsum/fiber board ("Test Board") was prepared in accordance with Example 1. The clear primer was applied to test boards by spraying the boards in the laboratory. The clear primer composition used on the test boards in Table 7 was the composition shown above in Table 2 as Composition F (clear). The test boards were subjected to various tests and the results test results are shown below in Table 7.

TABLE 7

| Tests | Gypsum Board | Test Board no coating | Test Board AC3103 Clear Primer | Test Board AC3103 Clear Primer | Test Board AC3103 Clear Primer |
|---|---|---|---|---|---|
| Polymer Solids/ft$^2$ | None | None | 0.345–.368 g/ft$^2$ | 0.414–.437 g/ft$^2$ | 0.414–.437 g/ft$^2$ |
| Coating Wt | None | None | 15 g/ft$^2$ | 19 g/ft$^2$ | 19 g/ft$^2$ |
| Open Time -APRM | 10 | 7 | 9 | 11 | 9 |
| Application-APRM | 10 | 6 | 7 | 9 | 9 |
| Open Time Semi-gloss Latex | 10 | 5 | 6 | 7 | 8 |
| Dry Hide - Semi-gloss Latex | 10 | 8 | 10 | 10 | 12 |
| Abrasion (Weight loss) | .05 | .17 | .02 | .01 | .01 |

The test data shown in Table 7 indicates that in this test the primer improved the working time for joint compound applied to the Test Boards, and that the primer improved the joint compound application properties. The test data shown in Table 7 indicates that the primer generally improves the paintability of the Test Boards. The slight performance variations in the paintability data for the second and third test boards is within the limits of this subjective type of tests, but the results show a clear improvement of paintability resulting from the use of the primer. The test data shown in Table 7 indicates that the primer improves the scuff resistance of the Test Boards to the point that the scuff resistance of the coated test boards is superior to conventional gypsum board. However, the data shows that for composition F (clear), the lower polymer solids of 0.345 to 0.368 grams per square foot of board, results in a smaller improvement in application properties and "open time" over those of an uncoated test board.

EXAMPLE 5

A composite paperless gypsum/fiber board ("Test Board") was prepared and coated in accordance with Example 1. The clear POLYCO 3103 primers applied to test boards were the compositions shown above in Table 2 as Compositions D and E (clear). The test boards were subjected to various tests and the test results are shown below in Table 8.

TABLE 8

| Tests | Gypsum Board | Test Board no coating | Test Board 3103 Composition E | Test Board 3103 Composition D |
|---|---|---|---|---|
| Polymer Solids/ft$^2$ | None | None | 0.504–.532 g/ft$^2$ | 0.90–.95 g/ft$^2$ |
| Coating Wt | None | None | 18–19 g/ft$^2$ | 18–19 g/ft$^2$ |
| Open Time-APRM | 10 | 6 | 6 | 9 |
| Application-APRM | 10 | 6 | 9 | 9 |
| Open Time Flat Latex | 10 | 5 | 9 | 8 |
| Open Time Semi-gloss Latex | 10 | 8 | 10 | 9 |
| Abrasion (Weight loss) | .04 | .06 | .01 | .01 |

The test data shown in Table 8 indicates that in this test the primers improved the working time for joint compound applied to the Test Boards, and that the primers improved the joint compound application properties. The test data shown in Table 8 indicates that the primers generally improve the paintability of the Test Boards. The test data shown in Table 8 indicates that the primers improve the scuff resistance of the Test Boards to the point that the scuff resistance of the coated test boards is superior to conventional gypsum board. Finally, the test data shown in Table 8 indicates that similar results may be obtained with two different primer compositions, as long as the polymer solids level applied on the board is within the preferred range of 0.50 to 1.00 grams per square foot of board.

The forms of invention shown and described herein are to be considered only as illustrative. It will be apparent to those skilled in the art that numerous modifications may be made therein without departing from the spirit of the invention and the scope of the appended claims.

We claim:

1. A paperless gypsum/fiber board with improved surface characteristics, said board having at least one surface comprising a combination of fully hydrated gypsum and reinforcing fiber, said surface having been coated with a primer comprising an aqueous emulsion of a film-forming polymeric material having a glass transition temperature in the range of 10 to 40° C. and said primer having been applied to said surface at about 0.35 to about 3.0 grams of polymeric material per square foot of board.

2. The paperless gypsum/fiber board as described in claim 1, wherein said polymeric material has a glass transition temperature of 12 to 20° C.

3. The paperless gypsum/fiber board as described in claim 1, wherein said polymeric material comprises an acrylic polymer selected from the group consisting of acrylic polymers, acrylic copolymers and mixtures thereof.

4. The paperless gypsum/fiber board as described in claim 3, wherein said polymeric material comprises said acrylic polymer mixed with another thermoplastic polymer.

5. The paperless gypsum/fiber board as described in claim 1, wherein said primer comprises a filler.

6. The paperless gypsum/fiber board as described in claim 1, wherein said primer comprises a pigment.

7. The paperless gypsum/fiber board as described in claim 1, wherein said primer is a waterborne system containing from about 2.0 to 3.0% solids, by weight.

8. The paperless gypsum/fiber board as described in claim 7, wherein said primer is applied to said board at about 0.5 to about 1.0 grams of polymeric material solids per square foot of board.

9. The paperless gypsum/fiber board as described in claim 1, wherein said board has surface characteristics suitable for the application of joint compound.

10. The paperless gypsum/fiber board as described in claim 1, wherein said board surface has uniform "suction" and uniform "absorption" of water from paint, adhesives and joint compounds so that paint, adhesives and joint compounds have adequate "working time."

11. A primer for a paperless gypsum/fiber board to provide said board with improved surface characteristics, said board comprising a combination of fully hydrated gypsum and reinforcing fiber, said primer comprising an aqueous emulsion of a film forming polymeric material having a glass transition temperature in the range of 10 to 40° C., said improved surface characteristics provided by applying said primer to the surface of said board at about 0.35 to about 3.0 grams of polymeric material per square foot of board.

12. The primer as described in claim 11, wherein said polymeric material has a glass transition temperature of 12 to 20° C.

13. The primer as described in claim 11, wherein said polymeric material comprises an acrylic polymer selected from the group consisting of acrylic polymers, acrylic copolymers and mixtures thereof.

14. The primer as described in claim 13, wherein said polymeric material comprises said acrylic polymer mixed with another thermoplastic polymer.

15. The primer as described in claim 11, wherein said primer comprises a filler.

16. The primer as described in claim 11, wherein said primer comprises a pigment.

* * * * *